United States Patent
Liang et al.

(10) Patent No.: US 11,632,553 B2
(45) Date of Patent: Apr. 18, 2023

(54) CODING PREDICTION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Fan Liang, Guangdong (CN); Haiyang Han, Guangdong (CN); Siqi Cao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/357,621

(22) Filed: Jun. 24, 2021

(65) Prior Publication Data
US 2021/0321112 A1    Oct. 14, 2021

Related U.S. Application Data

(63) Continuation of application No. PCT/CN2018/124504, filed on Dec. 27, 2018.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/147* (2014.11);
(Continued)

(58) Field of Classification Search
CPC .. H04N 19/137; H04N 19/105; H04N 19/147; H04N 19/159; H04N 19/176;
(Continued)

(56) References Cited

U.S. PATENT DOCUMENTS

| 11,012,715 B2 * | 5/2021 | Zhang .................. H04N 19/176 |
| 2615/0092851 | 4/2015 | Yoshikawa et al. |

(Continued)

FOREIGN PATENT DOCUMENTS

| CN | 105163116 A | 12/2015 |
| CN | 108886619 A | 11/2018 |
| WO | 2018047668 A1 | 3/2018 |

OTHER PUBLICATIONS

Huanbang Chen et al., (hereinafter Chen) "Description of SDR, HDR and 360o video coding proposal by Huawey, GoPro, HiSilicon, and Samsung" JVET-J0025_v2, San Diego, US, Apr. 10-20, 2018. (Year: 2018).*

(Continued)

*Primary Examiner* — Dramos Kalapodas
(74) *Attorney, Agent, or Firm* — Ladas & Parry LLP

(57) ABSTRACT

Provided are a coding prediction method and apparatus and a computer storage medium. The method includes that; for a coding block of an intra prediction type, Motion Vector (MV) Predictors (MVPs) of at least two control points of the coding block are determined; affine motion model-based motion estimation is performed on the coding block based on the MVPs of the at least two control points to obtain a first coding parameter of the coding block, the first coding parameter indicating a group of coding parameters corresponding to a minimum Rate-Distortion Cost (RDcost) obtained by performing motion estimation on the coding block in a non-translation motion manner; and prediction coding is performed on the coding block based on the first coding parameter.

16 Claims, 8 Drawing Sheets

(51) Int. Cl.
*H04N 19/147* (2014.01)
*H04N 19/159* (2014.01)
*H04N 19/176* (2014.01)
*H04N 19/567* (2014.01)

(52) U.S. Cl.
CPC ......... *H04N 19/159* (2014.11); *H04N 19/176* (2014.11); *H04N 19/567* (2014.11)

(58) Field of Classification Search
CPC ...... H04N 19/567; H04N 19/52; H04N 19/54; H04N 19/593
See application file for complete search history.

(56) References Cited

U.S. PATENT DOCUMENTS

| | | |
|---|---|---|
| 2017/0099499 A1 | 4/2017 | Yoshikawa et al. |
| 2017/0324982 A1 | 11/2017 | Yoshikawa et al. |
| 2018/0192047 A1 | 7/2018 | Lv et al. |
| 2018/0316929 A1 | 11/2018 | Li et al. |
| 2018/0359490 A1 | 12/2018 | Yoshikawa et al. |
| 2019/0028731 A1* | 1/2019 | Chuang ................ H04N 19/159 |
| 2019/0052906 A1 | 2/2019 | Yoshikawa et al. |
| 2019/0052907 A1 | 2/2019 | Yoshikawa et al. |
| 2019/0158870 A1 | 5/2019 | Xu et al. |
| 2019/0215534 A1* | 7/2019 | Kondo ................... H04N 19/61 |
| 2020/0336763 A1 | 10/2020 | Yoshikawa et al. |
| 2021/0258570 A1* | 8/2021 | Chen .................... H04N 19/176 |

OTHER PUBLICATIONS

Chen H et al: "Description of SDR, HDR and 360 video coding technology proposal by Huawei, GoPro, HiSilicon, and Samsung—general application scenario", 122. MPEG Meeting; Apr. 16, 2018-Apr. 20, 2018; San Diego; (Motion Picture Expert Group or ISO/IEC JTC1/SC29/WG11), No. m42355 Apr. 13, 2018 (Apr. 13, 2018). XP030261608, JVET-J0025.

Netravali An et al: "Motion-compensated coding: Some new results", Bell System Technical Journal, AT and T, Short Hills. NY, US, vol. 59, No. 9, Nov. 1, 1980 (Nov. 1, 1980 ) pp. 1735-1745, XP011632826, ISSN: 0005-8580, DOI: 10.1002/J.1538-7305.1980.TB03058.X [retrieved on Mar. 16, 2014].

Bradshaw D B et al: "A gradient based fast search algorithm for warping motion compensation schemes", Proceedings/International Conference On Image Processing: Oct. 26-29, 1997, Santa Barbara, California, IEEE Comput. Soc, Losalamitos, Calif. [U.A], vol. 3, Oct. 26, 1997 (Oct. 26, 1997), pp. 602-605, XP010253816,DOI: 10.1109/ICIP.1997.632193.

Xu Ji ZHENG et al: "Overview of the Emerging HEVC Screen Content Coding Extension", IEEE Transactions On Circuits and Systems for Video Technology, IEEE, USA, vol. 26, No. 1, Jan. 1, 2016 (Jan. 1, 2016), XP011592177, ISSN: 1051-8215, DOI: 10.1109/TCSVT.2015.2478706 [retrieved on Jan. 5, 2016].

Supplementary European Search Report in European application No. 18945171.9, dated Dec. 3, 2021.

English translation of the Written Opinion of the International Search Authority in the international application No. PCT/CN2018/124504, dated Aug. 28, 2019.

International Search Report in the international application No. PCT/CN2018/124504, dated Aug. 28, 2019.

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0076-v3; Title: CE8-2.2: Current picture referencing using reference index signaling.

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1002-v1; Title: Algorithm description for Versatile Video Coding and Test Model 2 (VTM 2).

\* cited by examiner

CODING PREDICTION METHOD AND APPARATUS, AND COMPUTER STORAGE MEDIUM

CROSS-REFERENCE TO RELATED APPLICATION

This application is a continuation application of International Patent Application No. PCT/CN2018/124504 filed on Dec. 27, 2018, the disclosure of which is incorporated herein by reference in its entirety.

BACKGROUND

With the rapid development of sciences and technologies, users have higher requirements on video watching and processing, and particularly, have more and more demands on Screen Content Videos (SCVs). High Efficiency Video Coding (HEVC) is for adaptation to videos with high resolutions and high picture rates, but the efficiency of typical Screen Content Coding (SCC) is not improved greatly. Therefore, an extended coding standard, i.e., SCC, has been proposed based on HEVC with regard to high contrast, limited colour data, more duplicated regions and other characteristics of screen content.

In most coding standards, adaptive inter/intra prediction is used based on blocks. For example, in the SCC standard, a basic block unit for video coding is called a Coding Unit (CU), and the same coding parameter is shared for pixels in the CU to improve the coding efficiency. The latest proposed coding and decoding technology is affine motion estimation and compensation capable of effectively tracking more complex motions, for example, rotation, scaling and transformation of a moving object, and is mainly applied to SCC of an inter prediction type. For an intra prediction type, an Intra Block Copy (IBC) coding mode is generally adopted in existing solutions. In the IBC coding mode, a Two-Dimensional (2D) translation motion model is considered only, and thus there is a further optimization space for coding.

SUMMARY

Embodiments of the disclosure relate to the technical field of video coding and decoding, and particularly to a coding prediction method and apparatus as well as a decoding method and a decoder.

According to a first aspect, the embodiments of the disclosure provide a coding prediction method, which may include the following operations.

For a coding block of an intra prediction type, Motion Vector (MV) Predictors (MVPs) of at least two control points of the coding block are determined.

Affine motion model-based motion estimation is performed on the coding block based on the MVPs of the at least two control points to obtain a first coding parameter of the coding block, the first coding parameter indicating a group of coding parameters corresponding to a minimum Rate-Distortion Cost (RDcost) and obtained by performing performing motion estimation on the coding block in a non-translation motion manner.

Prediction coding is performed on the coding block based on the first coding parameter.

According to a second aspect, the embodiments of the disclosure provide a coding prediction apparatus, which may include a determination unit, a motion estimation unit and a prediction unit.

The determination unit may be configured to determine MVPs of at least two control points of a coding block of an intra prediction type.

The motion estimation unit may be configured to perform affine motion model-based motion estimation on the coding block based on the MVPs of the at least two control points to obtain a first coding parameter of the coding block, the first coding parameter indicating a group of coding parameters corresponding to a minimum RDcost and obtained by performing motion estimation on the coding block in a non-translation motion manner.

The prediction unit may be configured to perform prediction coding on the coding block based on the first coding parameter.

According to a third aspect, the embodiments of the disclosure provide a coding prediction apparatus, which may include a memory and a processor.

The memory may be configured to store a computer program capable of running in the processor.

The processor may be configured to run the computer program to implement the operations of any method as described in the first aspect.

According to a fourth aspect, the embodiments of the disclosure provide a decoding method, which includes: creating a motion vector (MV) candidate list, receiving an index of a motion vector predictor (MVP index) from an encoder, obtaining a block vector (BV) based on the MVP index, and decoding a coding block subjected to prediction coding based on the BV to obtain a prediction pixel value of the coding block.

According to a fifth aspect, the embodiments of the disclosure provide a decoder including a processor and memory storing a computer program executable by the processor. The processor is configured to run the computer program to implement operations of: creating a motion vector (MV) candidate list, receiving an index of a motion vector predictor (MVP index) from an encoder, obtaining a block vector (BV) based on the MVP index, and decoding a coding block subjected to prediction coding based on the BV to obtain a prediction pixel value of the coding block.

BRIEF DESCRIPTION OF THE DRAWINGS

FIG. 88 is a schematic diagram of an MV sample of each sub block in a coding block according to an embodiment of the disclosure.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

The Joint Video Exploration Team (JVET) is a working team set up by the Video Coding Experts Group (VCEG) of the International Telecommunication Union Telecommunication Standardization Sector (ITU-T) and the Moving Picture Experts Group (MPEG) of the International Organization for Standardization (ISO)/International Electrotechnical Commission (IEC) in October, 2015. The mission of the working team is to make a next-generation video coding standard. A. Joint Exploration Test Model (JEM) is a universal reference software platform, and verification of different coding tools is implemented based on this platform. The JVET formally named the next-generation video coding standard after Versatile Video Coding (VVC) in April, 2018, and a corresponding test model is a View Transformation Model (VTM). In July, 2018, the JEVT hammered out algorithm descriptions and coding methods of VVC working draft 2 and VTM2 in the 11th meeting. Based on an original HEVC Test Model (HM), the JVET adds more novel tools, for example, a Quadtree with nested multi-type tree (MT) (consisting of structures of a Quad Tree (QT), a Binary Tree (BT) and a Trigeminal Tree (TT)), affine motion compensation, Sub-Block Based Temporary Motion Vector Prediction (SbTMVP) and Adaptive Motion Vector Resolution (AMVR).

A basic principle of video coding compression is to remove a redundancy by use of a correlation among a space domain, a time domain and a codeword. A popular coding manner is to implement video coding compression based on a block-based hybrid video coding picturework through prediction (including intra prediction and inter prediction), transformation, quantization, entropy coding and the like. Such a coding picturework is high in vitality, and the block-based hybrid video coding picturework is still adopted for HEVC.

Based on a characteristic of a screen content, an SCC standard is extended based on HEVC, and standardization of the standard has been completed basically in 2016. Coding technologies such as IBC, a Palette Mode (PLT), Adaptive Color Transform (ACT) and AMVR are added to the SCC standard to improve the coding efficiency. When intra prediction is performed by SCC, an IBC coding mode may also be included in addition to ConventionalIntra Prediction (CIP). The IBC coding mode is a method like motion compensation, and a reference block matched with a current coding block is found from a current picture and is represented by a BV. The IBC coding mode will be introduced below in combination with FIG. 1 in detail.

Figure 1:
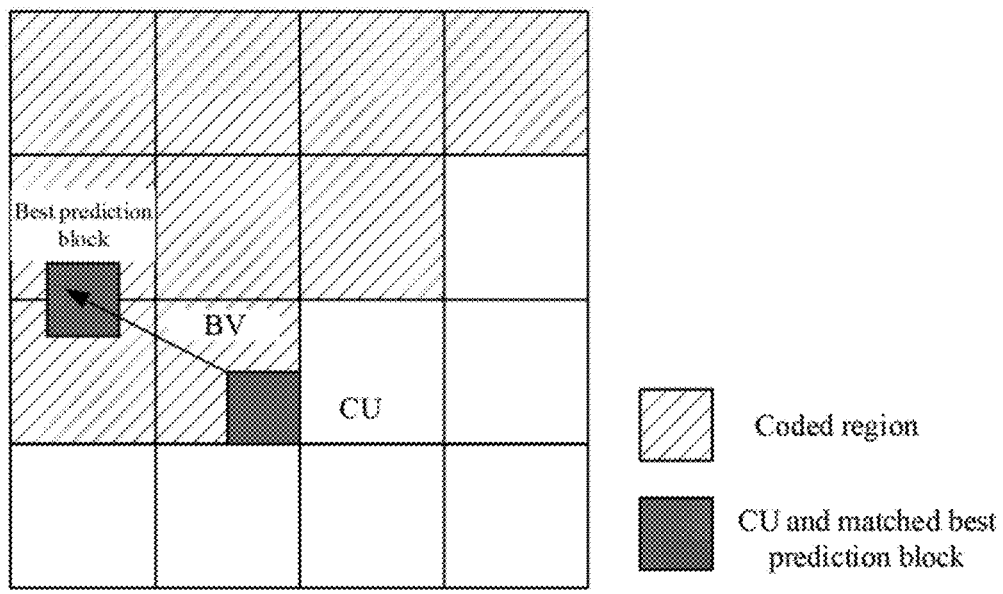
FIG. 1 is a structure diagram of an IBC coding mode according to a related technical solution.

Referring to FIG. 1, a structure diagram of an IBC coding mode according to a related technical solution is shown. As shown in FIG. 1, the slashed regions are search regions (i.e., coded regions in a current picture), the black shaded blocks are respectively a current CU (a present coding block) and a best block predictor matched with the current CU, and a distance between the current CU and the matched best block predictor is called a BV. In an existing extended HEVC standard, i.e., an HEVC-SCC standard, an IBC technology is proposed for SCC. A basic idea thereof is like conventional inter motion estimation, specifically a coded region of a current picture is searched for a reference block matched with a block to be encoded to obtain a distance between the two blocks. The distance is called a BC. Then a prediction residual is acquired based on the BV. The block to be encoded is finally encoded.

In a latest solution for a VVC reference model BMS2.1, the IBC coding mode, also called a Coding Picture Reference (CPR) mode, is mainly adopted for SCC. Here, the IBC coding mode may further be divided into a first sub coding mode (for example, an IBC Non-Merge mode) and a second sub coding mode (for example, an IBC Merge mode), and the two coding modes are applicable to coding blocks smaller than or equal to 16×16. The IBC coding mode will be introduced below through the two coding modes in detail.

The first sub coding mode takes the IBC Non-Merge mode as an example. The coding mode includes two search manners: hash-based search and pattern search.

Figure 2:
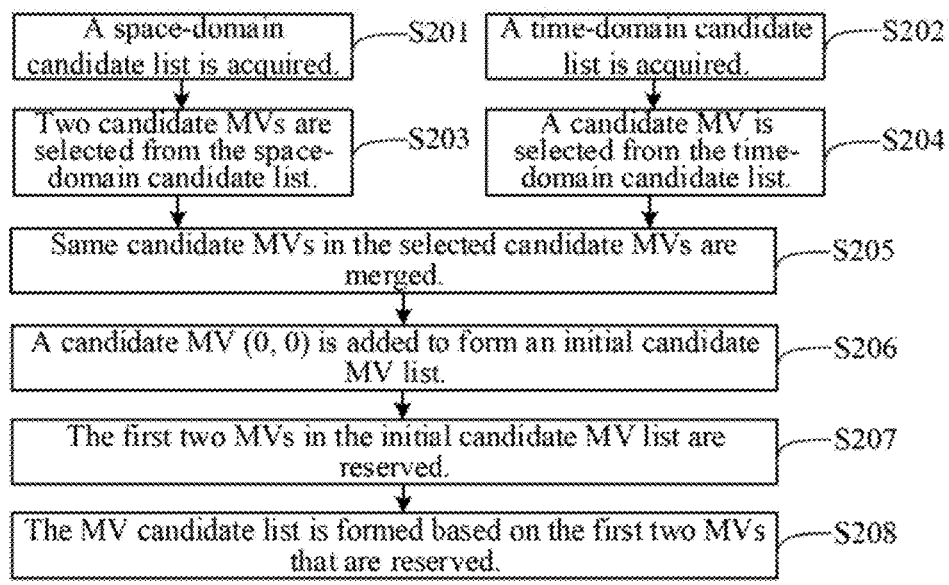
FIG. 2 is a flowchart of creating an MV candidate list according to a related technical solution.

Before search, an MV candidate list is needed to be created based on an inter Advanced Motion Vector Prediction (AMVP) technology. A creation process of the MV candidate list is shown in FIG. 2. Referring to FIG. 2, a flowchart of creating an MV candidate list according to a related technical solution is shown. The flow may include the following operations.

In S201, a space-domain candidate list is acquired.

In S202, a time-domain candidate list is acquired.

In S203, two candidate MVs are selected from the space-domain candidate list.

In S204, a candidate MV is selected from the time-domain candidate list.

In S205, same candidate MVs in the selected candidate MVs are merged.

In S206, a candidate MV (0, 0) is added to form an initial candidate MV list.

In S207, the first two MVs in the initial candidate MV list are reserved.

In S208, the MV candidate list is formed based on the first two MVs that are reserved.

It is to be noted that two MVPs may be obtained based on the MV candidate list obtained in S208. After the two MVPs are obtained, search may be started.

Figure 3:
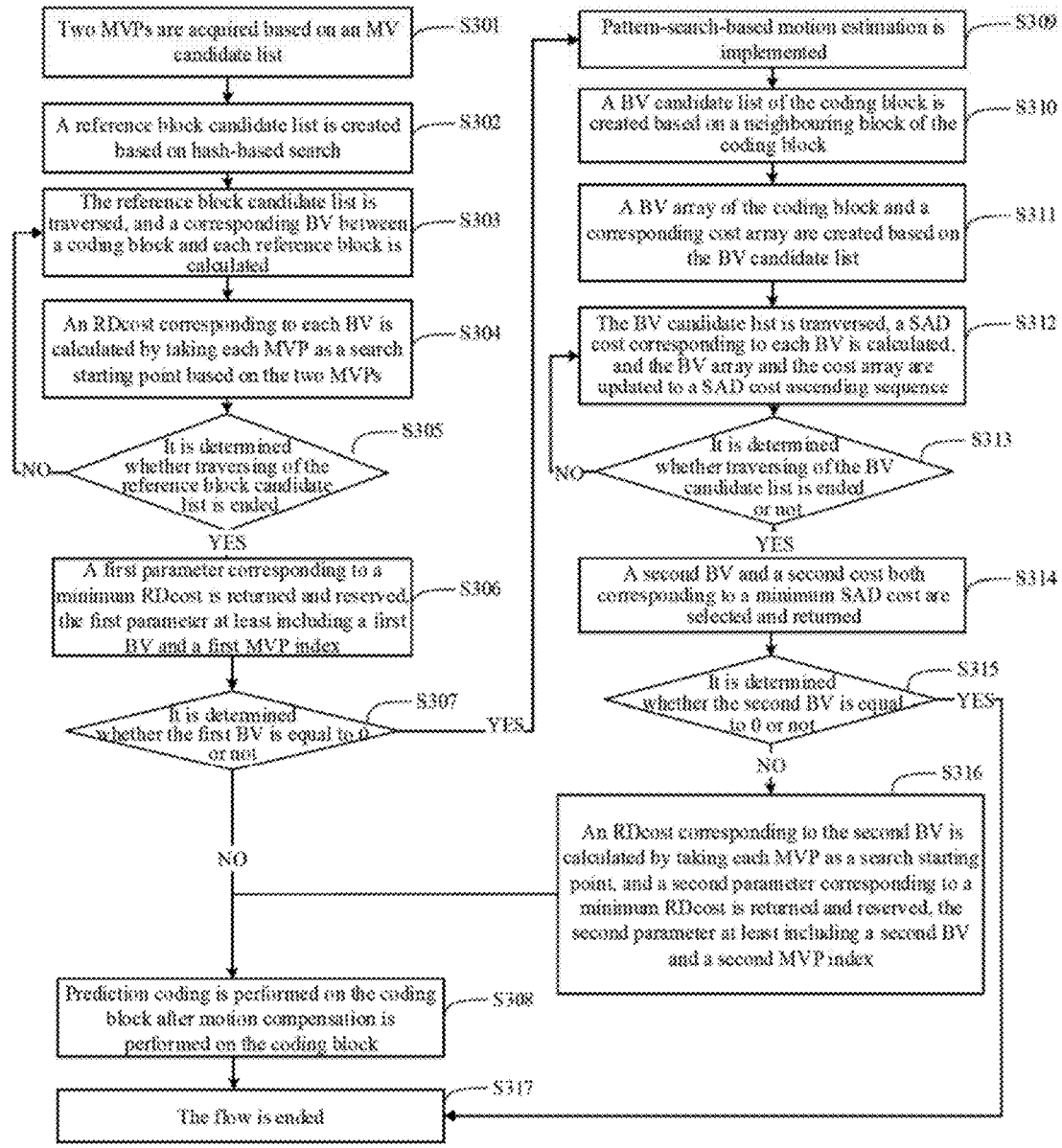
FIG. 3 is a flowchart of a Non-Merge mode under an IBC coding mode according to a related technical solution.

A search manner adopted first is hash-based search, and this search manner is for accelerating search of the whole picture. Hash key matching between a current coding block (Curblock) and a reference block (Refblock) is implemented by taking a 4×4 block as a basic unit. Here, selection of the reference block may be extended to all available size ranges of the whole picture. Referring to FIG. 3, a flowchart of a Non-Merge mode under an IBC coding mode according to a related technical solution is shown. The flow may include the following operations.

In S301, two MVPs are acquired based on an MV candidate list.

In S302, a reference block candidate list is created based on hash-based search, a hash key matching relationship being formed between each reference block in the reference block candidate list and a coding block.

In S303, the reference block candidate list is traversed, and a corresponding BV between the coding block and each reference block is calculated.

In S304, an RDcost corresponding to each BV is calculated by taking each MVP as a search starting point based on the two MVPs.

In S305, it is determined whether traversing of the reference block candidate list is ended or not.

In S306, after traversing is ended, a first parameter corresponding to a minimum RDcost is returned and reserved, the first parameter at least including a first BV and a first MVP index.

In S307, it is determined whether the first BV is equal to 0 or not.

In S308, when the first BV is not equal to 0, prediction coding is performed on the coding block after motion compensation is performed on the coding block.

It is to be noted that the operation that "the reference block candidate list is created" is specifically implemented as follows. At first, a mapping table between a coding block and a hash key is created by taking a 4×4 coding block as a basic unit in a whole current picture based on a position of the coding block. Then, hash key matching is performed on the coding block and a reference block. Only when a hash key of the coding block is equal to a hash key of the reference block, it is determined that the reference block may be matched with the coding block. The reference block candidate list may be created based on matched reference blocks.

It is also to be noted that the RDcost is calculated based on the BV and the MVP. That is, an RDcost has a corresponding relationship with a BV and an MVP. The reference block candidate list may be traversed, and there may be a BV between the coding block and each reference block in the reference block candidate list. Then, the RDcost corresponding to each BV may be calculated by taking each BVP as the search starting point based on the two MVPs, and in such a manner, an RDcost set may be obtained. The minimum RDcost may be selected from the RDcost set. Finally, a coding parameter corresponding to the minimum RDcost may be reserved as the first parameter.

In the embodiments of the disclosure, for S305, when traversing is not ended, S303 is re-executed to continue executing the flow. When traversing is ended, S306 is executed. Since the first parameter corresponding to the minimum RDcost is reserved, after S307, motion compensation may be performed on the coding block based on the first parameter to determine a prediction residual of the coding block, thereby performing prediction coding on the coding block. In the embodiments of the disclosure, the first parameter may not only include the first BV and the first MVP index but also include a first result (cost). No specific limits are made thereto in the embodiments of the disclosure.

Furthermore, when the first BV corresponding to the minimum RDcost after S306 is equal to 0 or no reference block matched with the coding block is found by hash-based search in S302, a pattern search may further be carried out. In such a search manner, a current picture is taken as a P picture, an inter prediction type is adopted, and the current picture is placed at the end of REF_PLC_LIST_0 as a reference picture for inter prediction. Still referring to FIG. 3, a search process may include the following operations.

In S309, when the first BV is equal to 0, pattern-search-based motion estimation is implemented.

In S310, a BV candidate list of the coding block is created based on a neighbouring block of the coding block.

In S311, a BV array of the coding block and a corresponding cost array are created based on the BV candidate list.

In S312, the BV candidate list is traversed, a Sum of Absolute Differences (SAD) cost corresponding to each BV is calculated, and the BV array and the cost array are updated to a SAD cost ascending sequence.

In S313, it is determined whether traversing of the BV candidate list is ended or not.

In S314, after traversing is ended, a second BV and a second cost both corresponding to a minimum SAD cost are selected and returned.

In S315, it is determined whether the second BV is equal to 0 or not.

In S316, when the second BV is not equal to 0, an RDcost corresponding to the second BV is calculated by taking each MVP as a search starting point, and a second parameter corresponding to a minimum RDcost is returned and reserved, the second parameter at least including a second BV and a second MVP index.

In S317, when the second BV is equal to 0, the flow is ended.

It is to be noted that the operation "the BV candidate list of the coding block is created" is specifically implemented as follows. At first, neighbouring blocks (Neiblocks) in an AMVP space-domain candidate list corresponding to the current coding block are accessed respectively. When an IBC coding mode is adopted for a neighbouring block, a reference block (NeiRefblock) of the neighbouring block may be reused as a reference of the coding block. Then, a BV between the coding block and the NeiRefblock is calculated and added to the BV candidate list of the coding block, thereby creating the BV candidate list of the coding block.

It is also to be noted that the BV array and the corresponding cost array may be created based on the BV candidate list and the two arrays are arranged in a SAD cost ascending order. The BV candidate list may be traversed, and the sequences of the two arrays may be updated in real time based on the SAD cost corresponding to each calculated BV. After traversing is ended, only 0th elements in the two arrays, i.e., the second cost and second BV corresponding to the minimum SAD cost, are returned. Next, the RDcost corresponding to the returned second BV may be calculated by each MVP as a search starting point, and the second parameter corresponding to the minimum RDcost may be stored. Then, after S316, motion compensation may also be performed on the coding block based on the second parameter to determine the prediction residual of the coding block, thereby performing prediction coding on the coding block. In the embodiments of the disclosure, the second parameter may not only include the second BV and the second MVP index but also include the second cost. No specific limits are made thereto in the embodiments of the disclosure.

Motion compensation may be performed on the coding block based on the best results obtained by the two search manners to determine the prediction residual, and then prediction coding may be performed on the coding block.

On an encoder side, the encoder is only required to transmit a corresponding MVP index and a Motion Vector Difference (MVD) between a BV and an MVP. On a decoder side, the decoder may create a MV candidate list at first in the same manner and may obtain the BV based on the transmitted MVP index and MVD, thereby performing decoding processing on the coding block subjected to prediction coding to obtain a prediction pixel value of the coding block. Then, the decoder may add the prediction pixel value and the prediction residual transmitted by the encoder to obtain a reconstructed pixel value corresponding to each pixel in the coding block.

Figure 4:
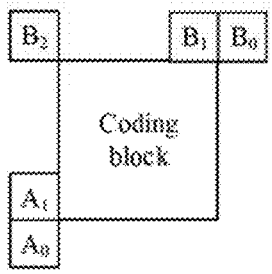
FIG. 4 is a structure diagram of a neighbouring block configuration in a Merge mode under an IBC coding mode according to a related technical solution.
Figure 5:
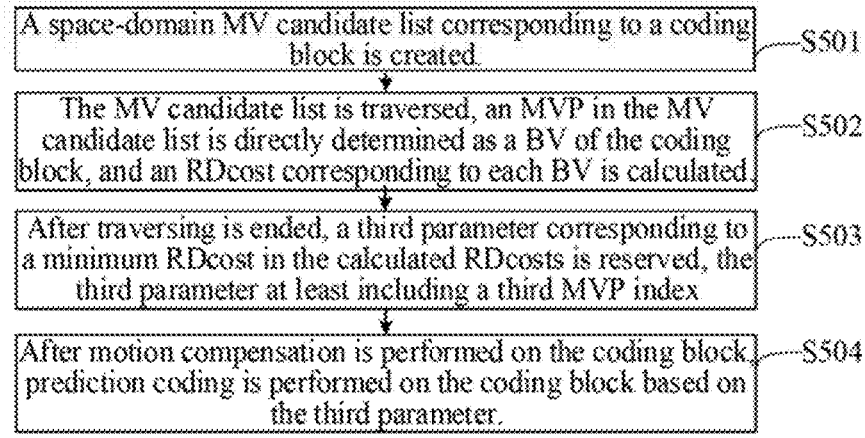
FIG. 5 is a flowchart of a Merge mode under an IBC coding mode according to a related technical solution.

The second sub coding mode takes the IBC Merge mode as an example. In the coding mode, a current picture is taken as a P picture, an inter prediction type is adopted, and the current picture is taken as a reference picture for inter prediction. Referring to FIG. 4, a structure diagram of a neighbouring block configuration in a Merge mode under an IBC coding mode according to a related technical solution is shown. As shown in FIG. 4, an MV candidate list of a coding block may be created according to priority A1→B1→B0→A4→B2 as shown in FIG. 4. Referring to FIG. 5, a flowchart of a Merge mode under an IBC coding mode according to a related technical solution is shown. The flow may include the following operations.

In S501, a space-domain MV candidate list corresponding to a coding block is created.

In S502, the MV candidate list is traversed, an MVP in the MV candidate list is directly determined as a BV of the coding block, and an RDcost corresponding to each BV is calculated.

In S503, after traversing is ended, a third parameter corresponding to a minimum RDcost in the calculated RDcosts is reserved, the third parameter at least including a third MVP index.

In S504, after motion compensation is performed on the coding block, prediction coding is performed on the coding block based on the third parameter.

It is to be noted that the operation that "the space-domain MV candidate list corresponding to the coding block is created" is specifically as follows. In combination with a configuration structure shown in FIG. 4, at most four space-domain candidate MVs are selected according to the sequence A1→B1→B0→A0→B2 and placed in the MV candidate list, so that the MV candidate list corresponding to the coding block may be created.

In the second sub coding mode, since a BV and an MVP are the same, no MVD in the first sub coding mode exists. On an encoder side, the encoder is only required to transmit an MVP index. On the decoder side, the decoder may create an MV candidate list at first in the same manner and may directly obtain a BV based on the transmitted MVP index, thereby performing decoding processing on the coding block subjected to prediction coding.

In the IBC coding mode, the reference block matched with the coding block is still obtained based on a translation motion model, and consequently, a higher coding efficiency may be achieved in the IBC coding mode only for blocks repeatedly appearing in an SC. However, in an SCC scenario, there may also be such complex motion conditions such as scaling, rotation and transformation, and thus there is a further optimization space for encoding.

The embodiments of the disclosure provide a coding prediction method. An affine motion model is added based on the IBC coding mode, and a translation motion model is replaced with the affine motion model, so that the number of coding bits may further be reduced, and the coding rate is improved. Here, the coding prediction method provided in the embodiments of the disclosure may be applied not only to an intra prediction type of an encoder but also to an intra prediction type of a decoder. That is, the embodiments of the disclosure may be applied not only to a coding system but also to a decoding system. No specific limits are made in the embodiments of the disclosure.

the embodiments of the disclosure will be described below in combination with the drawings in detail by taking the intra prediction type of an encoder as an example.

Figure 6:
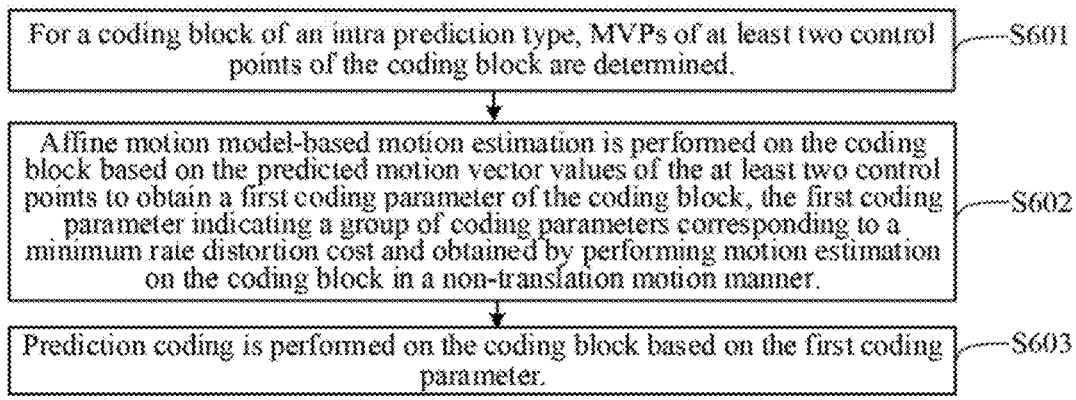
FIG. 6 is a flowchart of a coding prediction method according to an embodiment of the disclosure.

Referring to FIG. 6, a flow example of a coding prediction method according to an embodiment of the disclosure is shown. The method may include the following operations.

In S601, for a coding block of an intra prediction type, MVPs of at least two control points of the coding block are determined.

In S602, affine motion model-based motion estimation is performed on the coding block based on the predicted motion vector values of the at least two control points to obtain a first coding parameter of the coding block, the first coding parameter indicating a group of coding parameters corresponding to a minimum rate distortion cost and obtained by performing motion estimation on the coding block in a non-translation motion manner.

In S603, prediction coding is performed on the coding block based on the first coding parameter.

It is to be noted that multiple groups of coding parameters may be obtained by "performing affine motion model-based motion estimation on the coding block based on the MVPs of the at least two control points". RDcost calculation may be performed for different coding parameters to obtain RDcosts corresponding to the different coding parameters. The minimum RDcost may be selected from these RDcosts, and the group of coding parameters corresponding to the minimum RDcost are taken as the first coding parameters.

In the embodiment of the disclosure, the coding block is a coding block to be encoded in a current picture, and the intra prediction type is set. Accordingly, for the coding block of the intra prediction type, the MVPs of at least two control points of the coding block are determined at first; then affine motion model-based motion estimation is performed on the coding block based on the MVPs of the at least two control points to obtain the first coding parameter corresponding to the coding block, the first coding parameter indicating the group of coding parameters corresponding to the minimum RDcost and obtained by performing non-translation motion manner-based motion estimation on the coding block; and finally, prediction coding is performed on the coding block based on the first coding parameter. With addition of affine motion model-based motion estimation, the existence of complex non-translation motions, such as scaling, rotation and transformation, of a coding block of the intra prediction type in a screen picture may be eliminated, the number of coding bits is further reduced, and the coding rate is further improved.

Figure 7A:
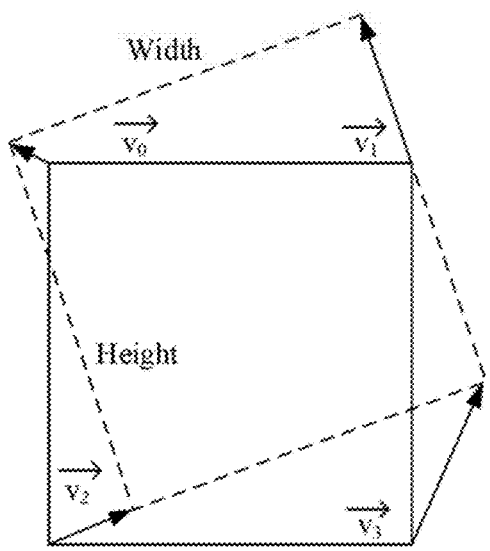
FIG. 7A and FIG. 7B are structure diagrams of a non-translation motion of a coding block according to an embodiment of the disclosure.
Figure 7B:
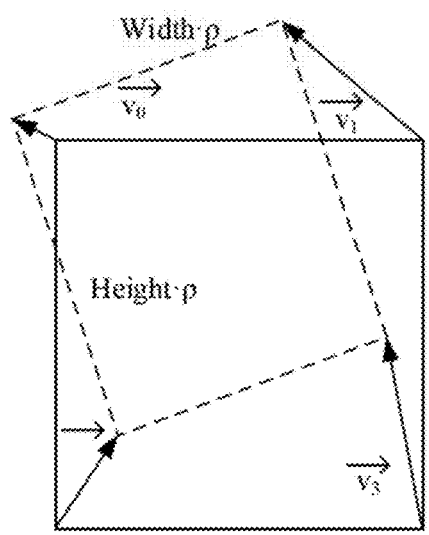

It is to be noted that an affine motion model is a novel technology for an inter prediction type. In HEVC, inter prediction is based on motion compensation of a coding block, and a translation motion model is usually adopted. That is, there is made such a hypothesis that MVs of all pixels in a coding block are the same and are usually replaced with a BV of a top-left vertex of the coding block. However, during a practical application, the coding block may also have non-translation motions such as a scaling motion, a rotational rotation and a transformation motion. FIG. 7A and FIG. 7B show a rotational motion of a coding block and a scaling motion of the coding block respectively.

p is a scaling coefficient, and a value of p is specifically set according to a practical condition. No specific limits are made in the embodiment of the disclosure.

Figure 8A:
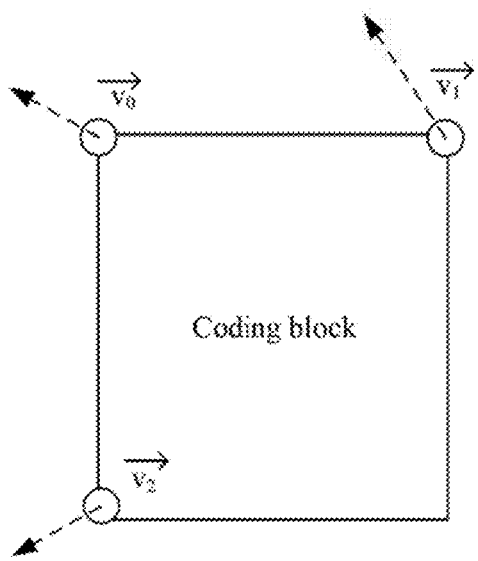
FIG. 8A is a schematic diagram of MVs of at least two control points of a coding block according to an embodiment of the disclosure.

Here, motion compensation is implemented based on the affine motion model through MVs of control points. The control points are represented in two modes, for example, two control points and three control points. A reference block (or called a mapped block) corresponding to the coding block may be found from a reference picture by use of the MVs of the control points. Referring to FIG. 8A, a schematic diagram of MVs of at least two control points of a coding block according to an embodiment of the disclosure is shown. When two control points, i.e., MVs of top-left and top-right vertexes, are adopted for the coding block, namely $\vec{v}_0$ and $\vec{v}_1$ shown in FIG. 8A, the affine motion model is also called a four-parameter affine model. When three control points, i.e., MVs of top-left, top-right and bottom-left vertexes, are adopted for the coding block, namely $\vec{v}_0$, $\vec{v}_1$ and $\vec{v}_2$ shown in FIG. 8A, the affine motion model is also called a six-parameter affine model.

When the four-parameter affine model is adopted, an MV of each 4×4 sub block in the coding block may be deduced through formula (1):

$$\begin{cases} v_x = \dfrac{v_{1x} - v_{0x}}{w}x + \dfrac{v_{1y} - v_{0y}}{w}y + v_{0x} \\ v_y = \dfrac{v_{1y} - v_{0y}}{w}x + \dfrac{v_{1x} - v_{0y}}{w}y + v_{0y} \end{cases} \quad (1)$$

When the six-parameter affine model is adopted, an MV of each 4×4 sub block in the coding block may be deduced through formula (2):

$$\begin{cases} v_x = \dfrac{v_{1x} - v_{0x}}{w}x + \dfrac{v_{2x} - v_{0x}}{h}y + v_{0x} \\ v_y = \dfrac{v_{1y} - v_{0y}}{w}x + \dfrac{v_{2y} - v_{0y}}{h}y + v_{0y} \end{cases} \quad (2)$$

w and h represent a width and height of the coding block respectively, the MV of the top-left vertex is $\vec{v}_0=(v_{0x},v_{0y})$, the MV of the top-right vertex is $\vec{v}_1=(v_{1x},v_{1y})$ the MV at the bottom-left vertex is $\vec{v}_2=(v_{2x},v_{2y})$, and an MV corresponding to each pixel (x,y) in the coding block is $\vec{v}=(v_x,v_y)$.

Figure 8B:
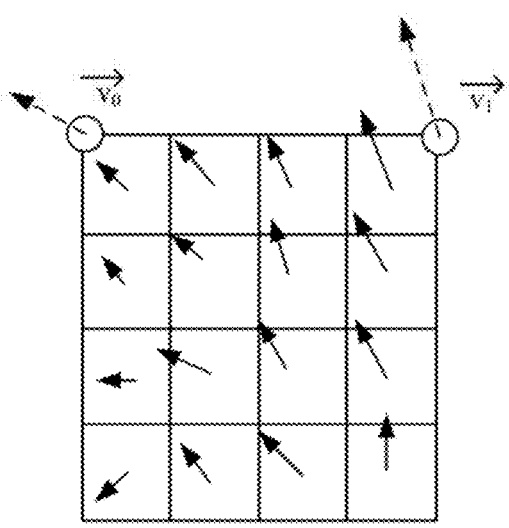

Referring to FIG. 8B, a schematic diagram of an MV sample of each sub block in a coding block according to an embodiment of the disclosure is shown. For an MV sample of each sub block shown in FIG. 8B, coding prediction of each sub block may be completed by a motion compensation difference filter in combination with the MVs deduced through the formula (1) or the formula (2). Therefore, complex motion conditions may be described better by affine motion compensation. In the embodiment of the disclosure, the affine motion model is applied to the coding block based on the intra prediction type, so that the number of the coding bits may further be reduced, and the coding rate is further improved.

It can be understood that a coding mode corresponding to the coding block at least includes an IBC coding mode and an IBCAffine coding mode. That is, the IBC coding mode may be selected for prediction coding of the coding block, or the IBCAffine coding mode may be selected for prediction coding. However, no specific limits are made in the embodiment of the disclosure.

In some embodiments, before the operation that the MVPs of the at least two control points of the coding block are determined for the coding block of the intra prediction type, the method may further include the following operations.

A best BV of the coding block is acquired.

When the best BV is equal to 0, a first motion estimation result of the coding block based on the IBCAffine coding mode and a second motion estimation result of the coding block based on the IBC coding mode are calculated respectively.

When the first motion estimation result is not greater than a preset multiple of the second motion estimation result, the IBCAffine coding mode is selected for the coding block.

When the first motion estimation result is greater than the preset multiple of the second motion estimation result, the IBC coding mode is selected for the coding block.

Furthermore, in some embodiments, the operation that the best BV of the coding block is acquired may include the following operations.

IBC search is performed on the coding block, at least one reference block matched with a hash key of the coding block is selected, and a first candidate block list of the coding block is created based on the at least one reference block.

The first candidate block list is traversed, and a BV between the coding block and each reference block in the first candidate block list is calculated.

RDcosts corresponding to different BVs are calculated based on the BVs respectively, and the BV corresponding to the minimum RDcost in the RDcosts is determined as the best BV of the coding block.

It is to be noted that the preset multiple is a preset judgment value configured to determine whether to adopt the IBCAffine coding mode for the coding block or not. In the embodiment of the disclosure, the preset multiple may be set to be 1.05 times. However, in a practical application, the preset multiple may be specifically limited according to a practical condition. No specific limits are made in the embodiment of the disclosure.

It is also to be noted that, for the two coding modes (the IBC coding mode and the IBCAffine coding mode) for the coding block, when the best coding mode (i.e., the coding mode presently selected for the coding block) is determined for the coding block, a flag value of the best coding mode may be set to be True, thereby indicating the coding mode adopted for the coding block in a coding system and further performing prediction coding based on the coding mode.

Furthermore, in some embodiments, when the IBCAffine coding mode is selected for the coding block, the operation that affine motion model-based motion estimation is performed on the coding block based on the MVPs of the at least two control points to obtain the first coding parameter of the coding block may include the following operation.

Affine motion model-based motion estimation is performed on the coding block based on the MVPs of the at least two control points through the IBCAffine coding mode to obtain the first coding parameter of the coding block, the first coding parameter indicating a group of coding parameters corresponding to a minimum RDcost and obtained by performing affine motion model-based motion estimation on the coding block.

Furthermore, in some embodiments, when the IBC coding mode is selected for the coding block, the method may further include the following operations.

Translation motion model-based motion estimation is performed on the coding block based on the IBC coding mode to obtain a second coding parameter of the coding block, the second coding parameter indicating a group of coding parameters corresponding to a minimum RDcost and obtained by performing translation motion model-based motion estimation on the coding block.

Prediction coding is performed on the coding block based on the second coding parameter.

Furthermore, in some embodiments, after the operation that the best BV of the coding block is acquired, the method may further include the following operations.

When the best BV is not equal to 0, the best BV is directly determined as a third coding parameter of the coding block.

Prediction coding is performed on the coding block based on the third coding parameter.

It is to be noted that, for the two coding modes, when the best coding mode (i.e., the coding mode presently selected for the coding block) is determined for the coding block, a flag value of the best coding mode may be set to be True, thereby indicating the coding mode adopted for the coding block, It is also to be noted that the IBC coding mode may be divided into a first sub coding mode (for example, an IBC Non-Merge mode) and a second sub coding mode (for example, an IBC Merge mode), and the IBCAffine coding mode may further be divided into a third sub coding mode (for example, an IBCAffine Non-Merge mode) and a fourth sub coding mode (for example, an IBCAffine Merge mode). The first sub coding mode and the second sub coding mode have been specifically described above, the third sub coding mode and the fourth sub coding mode will be specifically described below respectively.

In the third sub coding mode, an IBC search (the search process is similar to the search process of the first sub coding mode) may be first performed on a coding block and a first candidate block list of the coding block may be created, a hash key matching relationship being formed between each reference block in the first candidate block list and the coding block. The first candidate block list may be traversed in combination with the two preset MVPs obtained in FIG. 2, and the RDcost corresponding to each BV may be calculated by taking the two preset MVPs as search starting points respectively. The BV corresponding to the minimum RDcost in the calculated RDcosts is determined as the best BV of the coding block. When the best BV is not equal to 0, it indicates that hash keys at any positions in the coding block are equal and IBCAffine coding mode-based motion estimation is not performed. In such case, the best BV may be directly determined as the third coding parameter corresponding to the coding block, and prediction coding may be performed on the coding block based on the third parameter. When the best BV is equal to 0, on one hand, IBCAffine coding mode-based motion estimation is required to be performed on the coding block (namely affine motion model-based motion estimation is performed on the coding block), and an obtained best result (for example, a result corresponding to the minimum RDcost) is called the first motion estimation result, represented by IBCAffineCost. On the other hand, IBC coding mode-based motion estimation is also required to be performed on the coding block (translation motion model-based motion estimation is performed on the coding block), and an obtained best result (for example, a result corresponding to the minimum RDcost) is called the second motion estimation result, represented by IBCCost. Here, there is made such a hypothesis that the preset multiple is 1.05 times. In case of IBCAffine-Cost≥1.05×IBCCost, the IBCAffine coding mode is selected for the coding block, and the first coding parameter corresponding to the minimum RDcost (for example, a first BV and a corresponding first MVP index). In case of BCAffine-Cost>1.05×IBCCost, the IBC coding mode is selected for the coding block, and the second coding parameter corresponding to the minimum RDcost (for example, a second BV and a corresponding second MVP index) may be obtained. Therefore, motion compensation may be performed according to the obtained first coding parameter or second coding parameter to obtain a prediction residual of the coding block to implement prediction coding of the coding block.

In some embodiments, the operation that affine motion model-based motion estimation is performed on the coding block based on the MVPs of the at least two control points to obtain the first coding parameter of the coding block may include the following operations.

A prediction value of at least one pixel of the coding block in a reference picture is calculated based on the MVPs of the at least two control points.

An iterative operation is executed on a matching error of the at least one pixel of the coding block between an original picture and the reference picture and on a gradient matrix of the prediction value, and an MV is updated based on the iterative operation.

When a count of the iterative operation meets a preset count threshold, an updated MV is obtained.

The first coding parameter of the coding block is obtained based on the updated MV.

It is to be noted that, in the third sub coding mode, it is also needed to take the current picture as a P picture, set a prediction mode to be an inter prediction mode and place the current picture at the end of REF_PIC_LIST_0 as a reference picture for inter prediction. At first, two candidate MVPs of the coding block are acquired by inter Affine AMVP (AffineAMVP), each candidate MVP including at least two control points. Then, affine motion search is performed by taking each candidate MVP as a search starting point.

Specifically, for any pixel $(x_i, y_i)$ in the current coding block, a prediction value $S_i$ of a pixel at a corresponding position in a reference picture is represented through a formula (3):

$$s_i = s'(x_i + \Delta x_i, y_i + \Delta y_i). \quad (3)$$

$\Delta x_i$ and $\Delta y_i$ represent MVs of the coding block and are not changed linearly but determined by four parameters (a, b, $\omega_0$, $\omega_1$) in the following formula (4):

$$\begin{cases} \vec{A} = (a \ b \ \omega_0 \ \omega_1) \\ \Delta x_i = \vec{A}^T \cdot (1 \ 0 \ x \ -y). \\ \Delta y_i = \vec{A}^T \cdot (0 \ 1 \ y \ x) \end{cases} \quad (4)$$

a and b represent translation components of a pixel coordinate of the coding block in the reference picture after rotational transformation respectively, wo and oi represent parameters in a rotation matrix after scaling transformation is performed on the coding block based on the coefficient p, and $\vec{A}^T$ represents transpose of $\vec{A}$ from a row vector to a column vector.

First-order taylor expansion is performed on the formula (3) to obtain formula (5), as shown below:

$$\hat{s}(x_i, y_i) \approx s'(x_i, y_i) + \underbrace{\frac{\partial s'}{\partial x}\bigg|_{x=x_i, y=y_i}}_{G_{xi}} \times \Delta x_i + \underbrace{\frac{\partial s'}{\partial y}\bigg|_{x=x_i, y=y_i}}_{G_{yi}} \times \Delta y_i. \quad (5)$$

$G_{xi}$ and $G_{yi}$ represent gradient values and are obtained by Sobel gradient calculation. According to the formula (5), a prediction error of any pixel $(x_i, y_i)$ in the coding block may be calculated through the following formula (6):

$$\underbrace{e(x_i, y_i)}_{0} = \underbrace{s(x_i, y_i) - s'(x_i, y_i)}_{1} - \underbrace{(G_{xi}x_iG_{xi} + y_iG_{yi}G_{yi}y_iG_{yi} - x_iG_{yi}) \cdot \overline{A}}_{2}. \quad (6)$$

Par 0 represents a prediction error of any pixel $(x_i, y_i)$ in the coding block, part 1 represents a matching error of any pixel $(x_i, y_i)$ in the coding block between an original picture and a reference picture, and part 2 represents a gradient matrix of a prediction value of a pixel at a corresponding position in the reference picture.

Accordingly, the iterative operation may be executed based on the gradient of the prediction value and the matching error, and the iterative operation process may update the MVs. When the count of the iterative operation meets the preset count threshold, the prediction error is minimum, and the obtained MVs are updated MVs that are finally required.

It is also to be noted that the preset count threshold is a preset iteration count required by determining that the prediction error is minimum. In the embodiment of the disclosure, for the four-parameter affine model, the preset count threshold may be 5; and for the six-parameter affine model, the preset count threshold may be 4. During the practical application, the preset count threshold may be specifically set according to a practical condition. No specific limits are made in the embodiment of the disclosure.

In some embodiments, for the coding block of the intra prediction type, the method may further include the following operations.

A second candidate block list of the coding block is created, a reference block in the second candidate block list being spatially neighbouring to the coding block and the reference block being encoded based on the IBCAffine coding mode.

The second candidate block list may be traversed, and MVs of control points at corresponding positions of the coding block may be calculated based on MVs of at least two control points of each reference block in the second candidate block list respectively.

A fourth coding parameter corresponding to the coding block may be acquired from the MVs, the fourth coding parameter indicating a group of coding parameters corresponding to the minimum RDcost among the obtained MVs of the coding block.

Prediction coding may be performed on the coding block based on the fourth coding parameter.

Figure 9A:
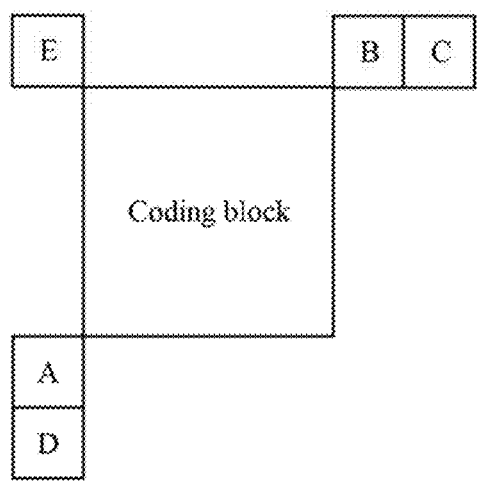
FIG. 9A is a structure diagram of creating a candidate list based on five neighbouring blocks according to an embodiment of the disclosure.
Figure 9B:
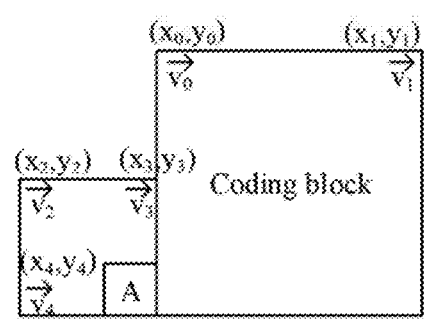
FIG. 9B is a structure diagram of deducing an MV at a corresponding position of a coding block based on a neighbouring block (A) according to an embodiment of the disclosure.

It is to be noted that, in the fourth sub coding mode, it is needed to create the second candidate block list of the coding block at first. Referring to FIG. 9A, a structure diagram of creating a candidate list based on five neighbouring blocks according to an embodiment of the disclosure is shown. The five neighbouring blocks A, B, C, D and E shown in FIG. 9A are sequentially accessed according to a sequence A→R→C→D→E. When the IBCAffine coding mode is adopted for a neighbouring block and the reference picture is the last picture (i.e., the current picture) in the sequence REF_PIC_LIST_0, the neighbouring block is placed in the second candidate block list as a reference block. Then, the second candidate block list is traversed to make a selection based on the number of the control points. When the number of the control points is 2, the formula (1) is selected to deduce the MVs of the control points at the corresponding positions of the current coding block; and when the number of the control points is 3, the formula (2) is selected to deduce the MVs of the control points at the corresponding positions of the current coding block, specifically referring to the example shown in FIG. 9B. The result corresponding to the minimum prediction residual (i.e., the minimum RDcost) may be selected from the obtained MVs and returned, the returned result being the fourth coding parameter, and prediction coding may be performed on the coding block based on the fourth coding parameter. That is, on an encoder side, the encoder is required to transmit MVP indexes in the second candidate block list and prediction residuals to a decoder. On the decoder side, the decoder may create a candidate block list the same as that of the encoder and calculate an MV of the current coding block through the formula (1) or the formula (2) based on the MVP indexes transmitted in a bit stream, thereby performing decoding processing on the coding block subjected to prediction coding.

The embodiment provides the coding prediction method. For the coding block of the intra prediction type, the MVPs of at least two control points of the coding block are determined at first; then affine motion model-based motion estimation is performed on the coding block based on the MVPs of the at least two control points to obtain the first coding parameter of the coding block, the first coding parameter indicating the group of coding parameters corresponding to the minimum RDcost and obtained by performing non-translation motion manner-based motion estimation on the coding block; and finally, prediction coding is performed on the coding block based on the first coding parameter. With addition of affine motion model-based motion estimation, the existence of non-translation motions, such as scaling, rotation and transformation, of a coding block of the intra prediction type in a screen picture may be eliminated, the number of coding bits is further reduced, and the coding rate is further improved.

Figure 10:
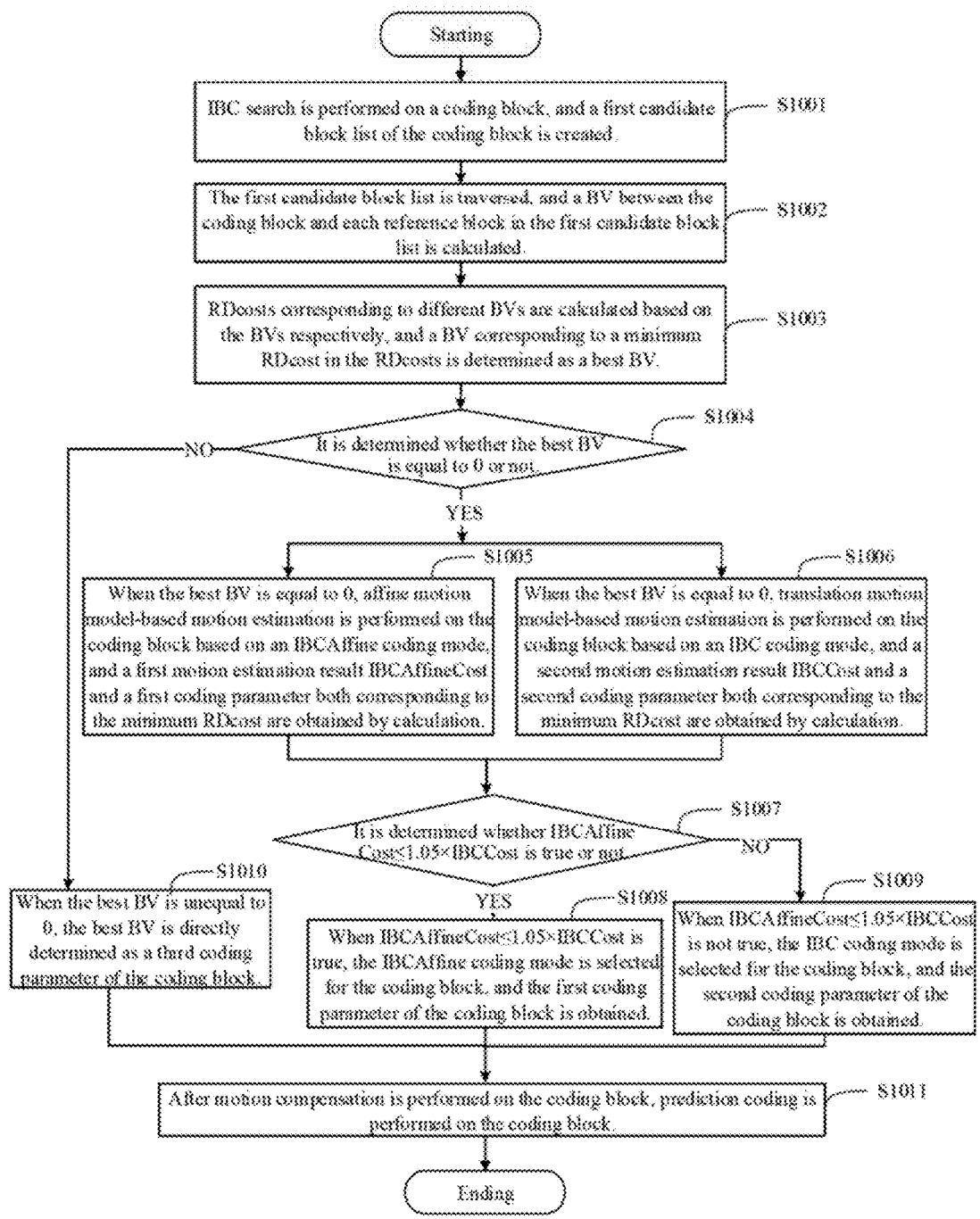
FIG. 10 is a detailed flowchart of a coding prediction method according to an embodiment of the disclosure.

Based on the same inventive concept of the abovementioned embodiment, referring to FIG. 10, a detailed flow of a coding prediction method according to an embodiment of the disclosure is shown. The detailed flow may include the following operations.

In S1001, IBC search is performed on a coding block, and a first candidate block list of the coding block is created.

In S1002, the first candidate block list is traversed, and a BV between the coding block and each reference block in the first candidate block list is calculated.

in S1003, RDcosts corresponding to different BVs are calculated based on the BVs respectively, and a BV corresponding to a minimum RDcost in the RDcosts is determined as a best BV.

In S1004, it is determined whether the best BV is equal to 0 or not.

In S1005, when the best BV is equal to 0, affine motion model-based motion estimation is performed on the coding block based on an IBCAffine coding mode, and a first motion estimation result IBCAffineCost and a first coding parameter both corresponding to the minimum RDcost are obtained by calculation.

In S1006, when the best BV is equal to 0, translation motion model-based motion estimation is performed on the coding block based on an IBC coding mode, and a second motion estimation result IBCCost and a second coding parameter both corresponding to the minimum RDcost are obtained by calculation.

In S1007, it is determined whether IBCAffineCost≥1.05× IBCCost is true or not.

In S1008, when IBCAffineCost≥1.05×IBCCost is true, the IBCAffine coding mode is selected for the coding block, and the first coding parameter of the coding block is obtained.

In S1009, when IBCAffineCost≤1.05×IBCCost is not true, the IBC coding mode is selected for the coding block, and the second coding parameter of the coding block is obtained.

In S1010, when the best BV is not equal to 0, the best BV is directly determined as a third coding parameter of the coding block.

In S1011, after motion compensation is performed on the coding block, prediction coding is performed on the coding block.

It is to be noted that, when the IBCAffine coding mode is not adopted for the coding block, processing may be performed directly according to the flowchart shown in FIG. 3 and elaborations are omitted herein. In addition, after S1004, it is determined whether the best BV is equal to 0 or not. When the best BV is equal to 0, S1005 and S1006 are executed. When the best BV is not equal to 0, S1010 is executed. S1011 may be executed after S1008, or S1009 or S1010.

It is also to be noted that the coding prediction method provided in the embodiment may be applied not only to the intra prediction type of an encoder but also to an intra prediction type of a decoder. That is, the embodiment of the disclosure may be applied not only to a coding system and but also to a decoding system. However, no specific limits are made in the embodiment of the disclosure.

Through the embodiment, specific implementation of the abovementioned embodiment is elaborated. It can be seen that, through the technical solution of the embodiment, with addition of affine motion model-based motion estimation, the existence of non-translation motions, such as scaling, rotation and transformation, of a coding block of the intra prediction type in a screen picture may be eliminated, the number of coding bits is further reduced, and the coding rate is further improved.

Figure 11:
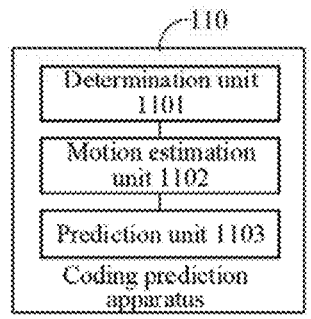
FIG. 11 is a composition structure diagram of a coding prediction apparatus according to an embodiment of the disclosure.

Based on the same inventive concept of the abovementioned embodiments, referring to FIG. 11, a composition of a coding prediction apparatus 110 according to an embodiment of the disclosure is shown, which may include a determination unit 1101, a motion estimation unit 1102 and a prediction unit 1103.

The determination unit 1101 is configured to, for a coding block of an intra prediction type, determine MVPs of at least two control points of the coding block.

The motion estimation unit 1102 is configured to perform affine motion model-based motion estimation on the coding block based on the MVPs of the at least two control points to obtain a first coding parameter of the coding block, the first coding parameter indicating a group of coding parameters corresponding to a minimum RDcost and obtained by performing motion estimation on the coding block in a non-translation motion manner.

The prediction unit 1103 is configured to perform prediction coding on the coding block based on the first coding parameter.

Figure 12:
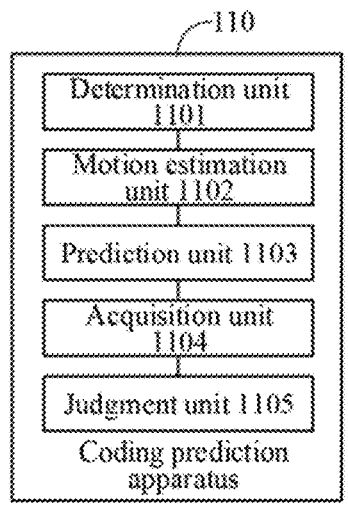
FIG. 12 is a composition structure diagram of another coding prediction apparatus according to an embodiment of the disclosure.

In the solution, referring to FIG. 12, the coding prediction apparatus 110 may further include an acquisition unit 1104 and a judgment unit 1105.

The acquisition unit 1104 is configured to acquire a best BV of the coding block.

The judgment unit 1105 is configured to, when the best BV is equal to 0, calculate a first motion estimation result of the coding block based on the IBCAffine coding mode and a second motion estimation result of the coding block based on the IBC coding mode respectively; when the first motion estimation result is not greater than a preset multiple of the second motion estimation result, select the IBCAffine coding mode for the coding block; and when the first motion estimation result is greater than the preset multiple of the second motion estimation result, select the IBC coding mode for the coding block.

In the solution, the acquisition unit 1104 is specifically configured to, perform IBC search on the coding block, select at least one reference block matched with a hash key of the coding block, create a first candidate block list of the coding block based on the at least one reference block, traverse the first candidate block list, calculate a BV between the coding block and each reference block in the first candidate block list, calculate RDcosts corresponding to different BVs based on the BVs respectively and determine the BV corresponding to the minimum RDcost in the RDcosts as the best BV of the coding block.

In the solution, the motion estimation unit 1102 is specifically configured to perform affine motion model-based motion estimation on the coding block based on the MVPs of the at least two control points through the IBCAffine coding mode to obtain the first coding parameter of the coding block, the first coding parameter indicating the group of coding parameters corresponding to a minimum RDcost and obtained by performing the affine motion model-based motion estimation on the coding block.

In the solution, the motion estimation unit 1102 is further configured to perform translation motion model-based motion estimation on the coding block based on the IBC coding mode to obtain a second coding parameter of the coding block, the second coding parameter indicating a group of coding parameters corresponding to a minimum RDcost and obtained by performing translation motion model-based motion estimation on the coding block.

The prediction unit 1103 is further configured to perform prediction coding on the coding block based on the second coding parameter.

In the solution, the motion estimation unit 1102 is further configured to, when the best BV is not equal to 0, directly determine the best BV as a third coding parameter corresponding to the coding block.

The prediction unit 1103 is further configured to perform prediction coding on the coding block based on the third coding parameter.

In the solution, the motion estimation unit 1102 is specifically configured to calculate a prediction value of at least one pixel of the coding block in a reference picture based on the MVPs of the at least two control points; execute an iterative operation on a matching error of the at least one pixel of the coding block between an original picture and the reference picture and on a gradient matrix of the prediction value; update an MV based on the iterative operation; when a count of the iterative operation meets a preset count threshold, obtain an updated MV; and obtain the first coding parameter of the coding block based on the updated MV.

In the solution, the motion estimation unit 1102 is further configured to, for the coding block of the intra prediction type, create a second candidate block list of the coding block, a reference block in the second candidate block list being spatially neighbouring to the coding block and the reference block being encoded based on the IBCAffine coding mode; traverse the second candidate block list and calculate MVs of control points at corresponding positions of the coding block based on MVs of at least two control points of each reference block in the second candidate block list respectively; and acquire a fourth coding parameter corresponding to the coding block from the MVs, the fourth coding parameter indicating a group of coding parameters corresponding to the minimum RDcost among the obtained MVs of the coding block.

The prediction unit 1103 is further configured to perform prediction coding on the coding block based on the fourth coding parameter.

It can be understood that, in the embodiment, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium, which stores a coding prediction program. The coding prediction program is executed by at least one processor to implement the operations of the method in the technical solution shown in FIG. 6.

Figure 13:
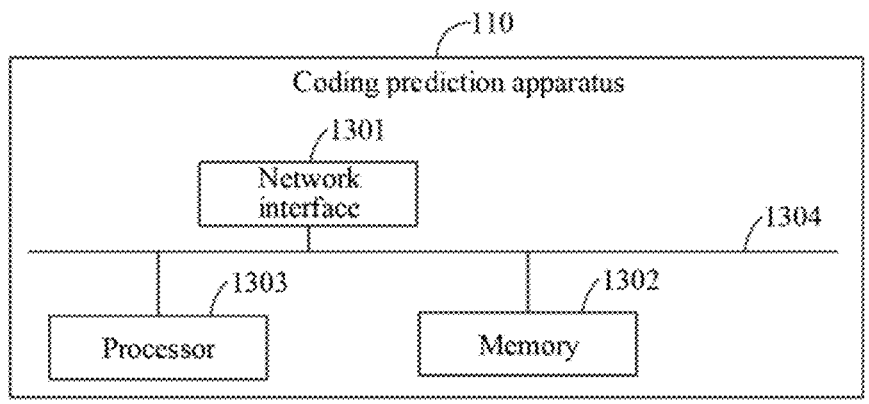
FIG. 13 is a specific hardware structure diagram of a coding prediction apparatus according to an embodiment of the disclosure.

Based on the composition of the coding prediction apparatus 110 and the computer storage medium, referring to FIG. 13, a specific hardware structure example of the coding prediction apparatus 110 according to an embodiment of the disclosure is shown, which may include a network interface 1301, a memory 1302 and a processor 1303. Each component is coupled together through a bus system 1304. It can be understood that the bus system 1304 is configured to implement connection communication between these components. The bus system 1304 includes a data bus and may further include a power bus, a control bus and a state signal bus. However, for clear description, various buses in FIG. 13 are marked as the bus system 1304. The network interface 1301 is configured to receive and send a signal in a process of receiving and sending information with another external network element.

The memory 1302 is configured to store a computer program capable of running in the processor 1303.

The processor 1303 is configured to run the computer program to execute the following operations, For a coding block of an intra prediction type, MVPs of at least two control points of the coding block are determined.

Affine motion model-based motion estimation is performed on the coding block based on the MVPs of the at least two control points to obtain a first coding parameter of the coding block, the first coding parameter indicating a group of coding parameters corresponding to a minimum RDcost and obtained by performing motion estimation on the coding block in a non-translation motion manner.

Prediction coding is performed on the coding block based on the first coding parameter.

It can be understood that the memory 1302 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DRRAM). It is to be noted that the memory 1302 of a system and method described herein is intended to include, but not limited to, memories of these and any other proper types.

The processor 1303 may be an integrated circuit chip with a signal processing capability. In an implementation process, each operation of the method may be completed by an integrated logic circuit of hardware in the processor 1303 or an instruction in a software form. The processor 1303 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the memory 1302. The processor 1303 reads information in the memory 1302 and completes the operations of the method in combination with hardware.

It can be understood that these embodiments described herein may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the processor 1303 is further configured to run the computer program to implement the operations of the method in the technical solution shown in FIG. 6.

It is to be noted that terms "include" and "contain" or any other variant thereof is intended to cover nonexclusive inclusions herein, so that a process, method, object or device including a series of elements not only includes those elements but also includes other elements which are not clearly listed or may further include elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority-inferiority of the embodiments but only for description.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a ROM/RAM, a magnetic disk and an optical disk), including a plurality of instructions configured to enable a computer (which may be a personal computer, a server, a network device or the like) to execute the method in each embodiment of the disclosure.

The embodiments of the disclosure are described above in combination with the drawings, but the disclosure is not limited to the abovementioned specific implementation modes. The abovementioned specific implementation modes are not restrictive but only schematic, those of ordinary skill in the art may be inspired by the disclosure to implement many forms without departing from the purpose of the disclosure and the scope of protection of the claims, and all these shall fall within the scope of protection of the disclosure.

INDUSTRIAL APPLICABILITY

In the embodiments of the disclosure, for a coding block of an intra prediction type, MVPs of at least two control points of the coding block are determined at first; then affine motion model-based motion estimation is performed on the coding block based on the MVPs of the at least two control points to obtain a first coding parameter of the coding block, the first coding parameter indicating a group of coding parameters corresponding to a minimum RDcost and obtained by performing non-translation motion manner-based motion estimation on the coding block; and finally, prediction coding is performed on the coding block based on the first coding parameter. With addition of affine motion model-based motion estimation, The existence of non-translation motions, such as scaling, rotation and transformation, of a coding block of the intra prediction type in a screen picture may be eliminated, the number of coding bits is further reduced, and the coding rate is further improved.

The invention claimed is:

1. A coding prediction method, comprising:
   determining Motion Vector (MV) Predictors (MVPs) of at least two control points of a coding block of an intra prediction type;
   performing affine motion model-based motion estimation on the coding block based on the MVPs of the at least two control points to obtain a first coding parameter of the coding block, the first coding parameter indicating a group of coding parameters corresponding to a minimum Rate-Distortion Cost (RDcost) and obtained by performing motion estimation on the coding block in a non-translation motion manner; and
   performing prediction coding on the coding block based on the first coding parameter;
   wherein a coding mode corresponding to the coding block comprises at least an Intra Block Copy (IBC) coding mode and an affine motion model-based IBC (IBCAffine) coding mode; and before determining the MVPs of the at least two control points of the coding block of the intra prediction type, the method further comprises:
   acquiring a best Block Vector (BV) of the coding block;
   calculating a first motion estimation result of the coding block based on the IBCAffine coding mode and a second motion estimation result of the coding block based on the IBC coding mode respectively;
   when the first motion estimation result is not greater than a preset multiple of the second motion estimation result selecting the IBCAffine coding mode for the coding block;
   when the first motion estimation result is greater than a preset multiple of the second motion estimation result, selecting the IBC coding mode for the coding block.

2. The method of claim 1, wherein acquiring the best BV of the coding block comprises:
   performing IBC search on the coding block, selecting at least one reference block matched with a hash key of the coding block, and creating a first candidate block list of the coding block based on the at least one reference block;
   traversing the first candidate block list, and calculating a BV between the coding block and each reference block in the first candidate block list; and
   calculating RDcosts corresponding to different BVs based on the BVs respectively, and determining the BV corresponding to the minimum RDcost in the RDcosts as the best BV of the coding block.

3. The method of claim 1, wherein, when the IBCAffine coding mode is selected for the coding block, performing the affine motion model-based motion estimation on the coding block based on the MVPs of the at least two control points to obtain the first coding parameter of the coding block comprises:
   performing the affine motion model-based motion estimation on the coding block based on the MVPs of the at least two control points through the IBCAffine coding mode to obtain the first coding parameter of the coding block, the first coding parameter indicating the group of coding parameters corresponding to the minimum RDcost and obtained by performing the affine motion model-based motion estimation on the coding block.

4. The method of claim 1, wherein, when the IBC coding mode is selected for the coding block, the method further comprises:
performing translation motion model-based motion estimation on the coding block based on the IBC coding mode to obtain a second coding parameter of the coding block, the second coding parameter indicating a group of coding parameters corresponding to a minimum RDcost and obtained by performing the translation motion model-based motion estimation on the coding block; and
performing prediction coding on the coding block based on the second coding parameter.

5. The method of claim 1, after acquiring the best BV of the coding block, further comprising:
when the best BV is not equal to 0, directly determining the best BV as a third coding parameter of the coding block; and
performing prediction coding on the coding block based on the third coding parameter.

6. The method of claim 1, wherein performing the affine motion model-based motion estimation on the coding block based on the MVPs of the at least two control points to obtain the first coding parameter of the coding block comprises:
calculating a prediction value of at least one pixel of the coding block in a reference picture based on the MVPs of the at least two control points;
executing an iterative operation on a matching error of the at least one pixel of the coding block between an original picture and the reference picture and on a gradient matrix of the prediction value, and updating an MV based on the iterative operation;
when a count of the iterative operation meets a preset count threshold, obtaining an updated MV; and
obtaining the first coding parameter of the coding block based on the updated MV.

7. The method of claim 1, further comprising:
creating a second candidate block list of the coding block of the intra prediction type, wherein a reference block in the second candidate block list is spatially neighbouring to the coding block and the reference block is encoded based on the IBCAffine coding mode;
traversing the second candidate block list, and calculating MVs of control points at corresponding positions of the coding block based on MVs of at least two control points of each reference block in the second candidate block list respectively;
acquiring a fourth coding parameter corresponding to the coding block from the MVs, the fourth coding parameter indicating a group of coding parameters corresponding to a minimum RDcost among the obtained MVs of the coding block; and
performing prediction coding on the coding block based on the fourth coding parameter.

8. A coding prediction apparatus, comprising:
a processor; and
memory, storing a computer program executable by the processor;
wherein the processor is configured to run the computer program to implement a method comprising:
determining Motion Vector (MV) Predictors (MVPs) of at least two control points of a coding block of an intra prediction type;
performing affine motion model-based motion estimation on the coding block based on the MVPs of the at least two control points to obtain a first coding parameter of the coding block, the first coding parameter indicating a group of coding parameters corresponding to a minimum Rate-Distortion Cost (RDcost) and obtained by performing motion estimation on the coding block in a non-translation motion manner; and
performing prediction coding on the coding block based on the first coding parameter;
wherein a coding mode corresponding to the coding block comprises at least an Intra Block Copy (IBC) coding mode and an affine motion model-based IBC (IBCAffine) coding mode; and before determining the MVPs of the at least two control points of the coding block of the intra prediction type, the method further comprises:
acquiring a best Block Vector (BV) of the coding block;
calculating a first motion estimation result of the coding block based on the IBCAffine coding mode and a second motion estimation result of the coding block based on the IBC coding mode respectively;
when the first motion estimation result is not greater than a preset multiple of the second motion estimation result, selecting the IBCAffine coding mode for the coding block;
or when the first motion estimation result is greater than a preset multiple of the second motion estimation result, selecting the IBC coding mode for the coding block.

9. The coding prediction apparatus of claim 8, wherein the processor is configured to run the computer program to implement the method further comprising:
performing IBC search on the coding block, selecting at least one reference block matched with a hash key of the coding block, creating a first candidate block list of the coding block based on the at least one reference block, traversing the first candidate block list, calculating a BV between the coding block and each reference block in the first candidate block list, calculating RDcosts corresponding to different BVs based on the BVs respectively and determining the BV corresponding to the minimum RDcost in the RDcosts as the best BV of the coding block.

10. The coding prediction apparatus of claim 8, wherein the processor is configured to run the computer program to implement the method further comprising:
performing the affine motion model-based motion estimation on the coding block based on the MVPs of the at least two control points through the IBCAffine coding mode to obtain the first coding parameter of the coding block, the first coding parameter indicating the group of coding parameters corresponding to the minimum RDcost and obtained by performing the affine motion model-based motion estimation on the coding block.

11. The coding prediction apparatus of claim 8, wherein the processor is configured to run the computer program to implement the method further comprising:
performing translation motion model-based motion estimation on the coding block based on the IBC coding mode to obtain a second coding parameter of the coding block, the second coding parameter indicating a group of coding parameters corresponding to a minimum RDcost and obtained by performing the translation motion model-based motion estimation on the coding block; and
performing prediction coding on the coding block based on the second coding parameter.

12. The coding prediction apparatus of claim 8, wherein the processor is configured to run the computer program to implement the method further comprising:
- when the best BV is not equal to 0, directly determining the best BV as a third coding parameter corresponding to the coding block; and
- performing prediction coding on the coding block based on the third coding parameter.

13. The coding prediction apparatus of claim 8, wherein the processor is configured to run the computer program to implement the method further comprising:
- calculating a prediction value of at least one pixel of the coding block in a reference picture based on the MVPs of the at least two control points;
- executing an iterative operation on a matching error of the at least one pixel of the coding block between an original picture and the reference picture and on a gradient matrix of the prediction value, and updating an MV based on the iterative operation;
- when a count of the iterative operation meets a preset count threshold, obtaining an updated MV; and
- obtaining the first coding parameter of the coding block based on the updated MV.

14. The coding prediction apparatus of claim 8, wherein the processor is configured to run the computer program to implement the method further comprising:
- creating a second candidate block list of the coding block of the intra prediction type, a reference block in the second candidate block list being spatially neighbouring to the coding block and the reference block being encoded based on the IBCAffine coding mode;
- traversing the second candidate block list and calculating MVs of control points at corresponding positions of the coding block based on MVs of at least two control points of each reference block in the second candidate block list respectively;
- acquiring a fourth coding parameter corresponding to the coding block from the MVs, the fourth parameter indicating a group of coding parameters corresponding to the minimum RDcost among the obtained MVs of the coding block; and
- performing prediction coding on the coding block based on the fourth coding parameter.

15. The coding prediction method of claim 1, wherein the first motion estimation result is a BV corresponding to a minimum RDcost acquired based on the IBCAffine coding mode, and the second motion estimation result is a BV corresponding to a minimum RD cost acquired based on the IBC coding mode; and the method further comprises:
- when the minimum RDcost corresponding to the first motion estimation result is not greater than a preset multiple of the minimum RDcost corresponding to the second motion estimation result, selecting the IBCAffine coding mode for the coding block; or
- when the minimum RDcost corresponding to the first motion estimation result is greater than the preset multiple of the minimum RDcost corresponding to the second motion estimation result, selecting the IBC coding mode for the coding block.

16. The coding prediction apparatus of claim 8, wherein the first motion estimation result is a BV corresponding to a minimum RDcost acquired based on the IBCAffine coding mode, and the second motion estimation result is a BV corresponding to a minimum RD cost acquired based on the IBC coding mode; and the method further comprises:
- when the minimum RDcost corresponding to the first motion estimation result is not greater than a preset multiple of the minimum RDcost corresponding to the second motion estimation result, selecting the IBCAffine coding mode for the coding block; or
- when the minimum RDcost corresponding to the first motion estimation result is greater than the preset multiple of the minimum RDcost corresponding to the second motion estimation result, selecting the IBC coding mode for the coding block.

\* \* \* \* \*